United States Patent
Do et al.

(10) Patent No.: US 8,234,579 B2
(45) Date of Patent: Jul. 31, 2012

(54) AGING AND ELIMINATION OF AVATARS AND ASSOCIATED OBJECTS FROM COMPUTER SIMULATED DISPLAYED VIRTUAL UNIVERSES

(75) Inventors: Lydia Mai Do, Research Triangle Park, NC (US); Rick Allen Hamilton, II, Charlottesville, NC (US); Kevin Glynn Paterson, San Antonio, TX (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/505,764

(22) Filed: Jul. 20, 2009

(65) Prior Publication Data

US 2011/0016410 A1    Jan. 20, 2011

(51) Int. Cl.
 *G06F 3/048* (2006.01)
(52) U.S. Cl. ........ 715/757; 715/751; 715/706; 705/14.2
(58) Field of Classification Search .............. 715/757, 715/751, 706; 705/14.12, 26.1, 27.1, 27.2; 345/473
See application file for complete search history.

(56) References Cited

U.S. PATENT DOCUMENTS

| | | | |
|---|---|---|---|
| 5,966,129 A | 10/1999 | Matsukuma et al. | |
| 6,884,163 B2 | 4/2005 | Namba et al. | |
| 2007/0002056 A1 | 1/2007 | Chen et al. | |
| 2008/0263449 A1 | 10/2008 | Schwartz et al. | |
| 2009/0058862 A1* | 3/2009 | Finn et al. | 345/473 |
| 2009/0089157 A1* | 4/2009 | Narayanan | 705/14 |
| 2009/0132297 A1* | 5/2009 | Jung et al. | 705/4 |
| 2009/0147003 A1 | 6/2009 | Do et al. | |
| 2009/0158151 A1* | 6/2009 | Cheng et al. | 715/706 |
| 2009/0281886 A1* | 11/2009 | Castelli et al. | 705/14.17 |
| 2010/0083139 A1* | 4/2010 | Dawson et al. | 715/757 |
| 2010/0199047 A1* | 8/2010 | Corrao et al. | 711/141 |
| 2010/0220097 A1* | 9/2010 | Hamilton et al. | 345/419 |

OTHER PUBLICATIONS

"Can you change a sims age?", tomshardware.com, 2005, retrieved on Sep. 23, 2011, URL http://www.tomshardware.com/forum/27745-13-change-sims.*
"Turn sims ageing off", forums.electronicarts.co.uk, n.d., retrieved on Sep. 23, 2011, URL http://forums.electronicarts.co.uk/sims-2/355729-turn-sims-ageing-off.html.*
Marc Saltzman, "Create, play and share in 'The Sims 3'", USAToday.com, Jun. 19, 2009, retrieved on Sep. 23, 2011, URL http://www.usatoday.com/tech/columnist/marcsaltzman/2009-06-18-sims3_N.htm.*
"Game Help:Sims 3 Aging", retrieved on Sep. 23, 2011, URL http://liveweb.archive.org/http://simswiki.info/wiki.php?title=Game_Help:Sims_3_Aging.*

(Continued)

*Primary Examiner* — Weilun Lo
*Assistant Examiner* — Rashedul Hassan
(74) *Attorney, Agent, or Firm* — Julius B. Kraft

(57) ABSTRACT

Aging of avatars and objects toward eventual removal or removal from the displayed virtual universe through enabling the setting of defined parameters for the aging of said avatars and objects toward eventual removal of said avatars and objects from said virtual universe space; and predetermining a set of events, the occurrence of any one of which events would modify the aging of selected avatars and objects.

20 Claims, 4 Drawing Sheets

OTHER PUBLICATIONS

"Mod The Sims—Individual Aging ON/OFF", Oct. 24, 2006, retrieved on Sep. 23, 2011, URL http://www.modthesims.info/download.php?t=160414.*

"News and Events—Community—The Sims 3", Jun. 2009, retrieved on Sep. 23, 2011, URL http://www.thesims3.com/community/news.html?selMonth=5&selYear=2009.*

"Death—The Sims Wiki", retrieved on Sep. 23, 2011, URL http://sims.wikia.com/wiki/Death.*

"Death", Sims.wikia.com, Sep. 14, 2007, retrieved on Sep. 23, 2011, URL http://web.archive.org/web/20070914175733/http://sims.wikia.com/wiki/Death.*

"Nine way to make your SIMS DIE!", Aug. 3, 2008, retrieved on Sep. 23, 2011, URL http://web.archive.org/web/20080803004016/http://games.sharing-info.com/2008/06/25/nine-way-to-make-your-sims-die.*

* cited by examiner

AGING AND ELIMINATION OF AVATARS AND ASSOCIATED OBJECTS FROM COMPUTER SIMULATED DISPLAYED VIRTUAL UNIVERSES

TECHNICAL FIELD

The present invention relates to computer display simulated virtual reality worlds or universes, and more particularly to the conserving of computer resources used for the unnecessary maintenance of unused and unattended objects in the displayed virtual universe space.

BACKGROUND OF RELATED ART

Over the past decade, there has been an immense increase in user participation in computer simulated displayed virtual reality worlds, such as implemented in massively multiplayer online games wherein the users are interconnected so that they are enabled to coact with each other by network, e.g. World Wide Web (Web), servers usually maintained by service providers or universe system managers who run such universes. Through his Web connections, the user/participant may access, on his computer controlled display, a virtual world with its own set of rules or laws based on the real world or some fantasy world. The rules or laws may be based on scientific laws such as gravity, energy and motion, as well as law based upon civilized or uncivilized human societal actions and intercommunications. While these simulated virtual reality worlds originally came from the computer game environment, there is currently considerable expansion into the education, commercial, the electronic business environments and particularly to the social environments.

In such social environments, the disabled and chronically ill may experience the emotional freedom gained from even temporarily expanding beyond there physical boundaries, through their created avatars, i.e. the virtual object representing the participant. It has been estimated that tens of millions of people worldwide are regular participants in simulated worlds. These user/participants have found at least recreational, social and even emotional satisfaction from such participation.

Because of the notoriety and popularity of computer simulated worlds, it has also been estimated that many times the number of regular participants have tried entering these simulated virtual worlds but have not found satisfaction, and have withdrawn from participating, usually without any further notice to the servers or hosts of the virtual worlds. When such casual users depart, their avatars and associated objects remain. Such associated objects include any possessions that the departed user developed or acquired during his participation. As used in this description, the term artifact object is intended to describe any non-human possession owned or associated with a user by an avatar (human) object. These left-over avatars and artifact objects do provide some undesirable clutter on the virtual world landscape; but, even more significantly, they place an unnecessary burden on the computer resources required to maintain the obsolete objects. The cleaning up of these unwanted and obsolete avatars and objects would be a significant advance in the "greening" of pervasive computing. In virtual universe systems, in present conventional use, there are objects and avatars that are unused for determined periods of time. The basic timing out of such avatars and objects may be referred to as aging. In existing virtual universe systems, the rules or parameters for this aging of avatars and objects is set at the system level, e.g. the level controlled by the system managers and virtual universe service providers.

SUMMARY OF THE PRESENT INVENTION

The present invention addresses the problem of aging of avatars and objects toward eventual removal from the displayed virtual universe. The invention provides implementations for enabling the setting, usually at the system or service provider level, of defined parameters for the aging of said avatars and objects toward eventual removal of said avatars and objects from said virtual universe space.

However, this invention further provides for enabling the setting, preferably at the user level, of a predetermined set of events, the occurrence of any one of these events would modify the aging of selected avatars and objects; and for means, responsive to the occurrence of one of said predetermined events, for modifying the aging of one or more of the avatars and objects. A significant aspect of the invention is the enablement of the user to set, at the user level, the predetermined set of events. These events would result in the modifying of the aging of the selected avatars and objects. The modifying may decelerate or accelerate the aging or it may reverse the aging.

In accordance with a more particular aspect of the invention, the eventual removal of said aged avatars and objects puts said avatars and objects into a dormant state renewable by a user. An avatar or object in such dormant state may be maintained in the virtual universe space as a low resolution version of the original avatar or object.

As will be hereinafter described in greater detail, a specific aspect of this invention relates to a virtual universe space in which a user owns virtual land in the virtual universe space; and the aging of the avatars and objects of the user in said owned land is decelerated by activity within this owned land.

Under certain conditions, the aging of avatars and objects owned by a user are decelerated based upon the frequency of said user visitation to the virtual universe space; this may even be a single visit after a long delay.

As will be hereinafter described in greater detail, aging of avatars and objects is decelerated by advertiser related activity in the area where said avatars and objects are located.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
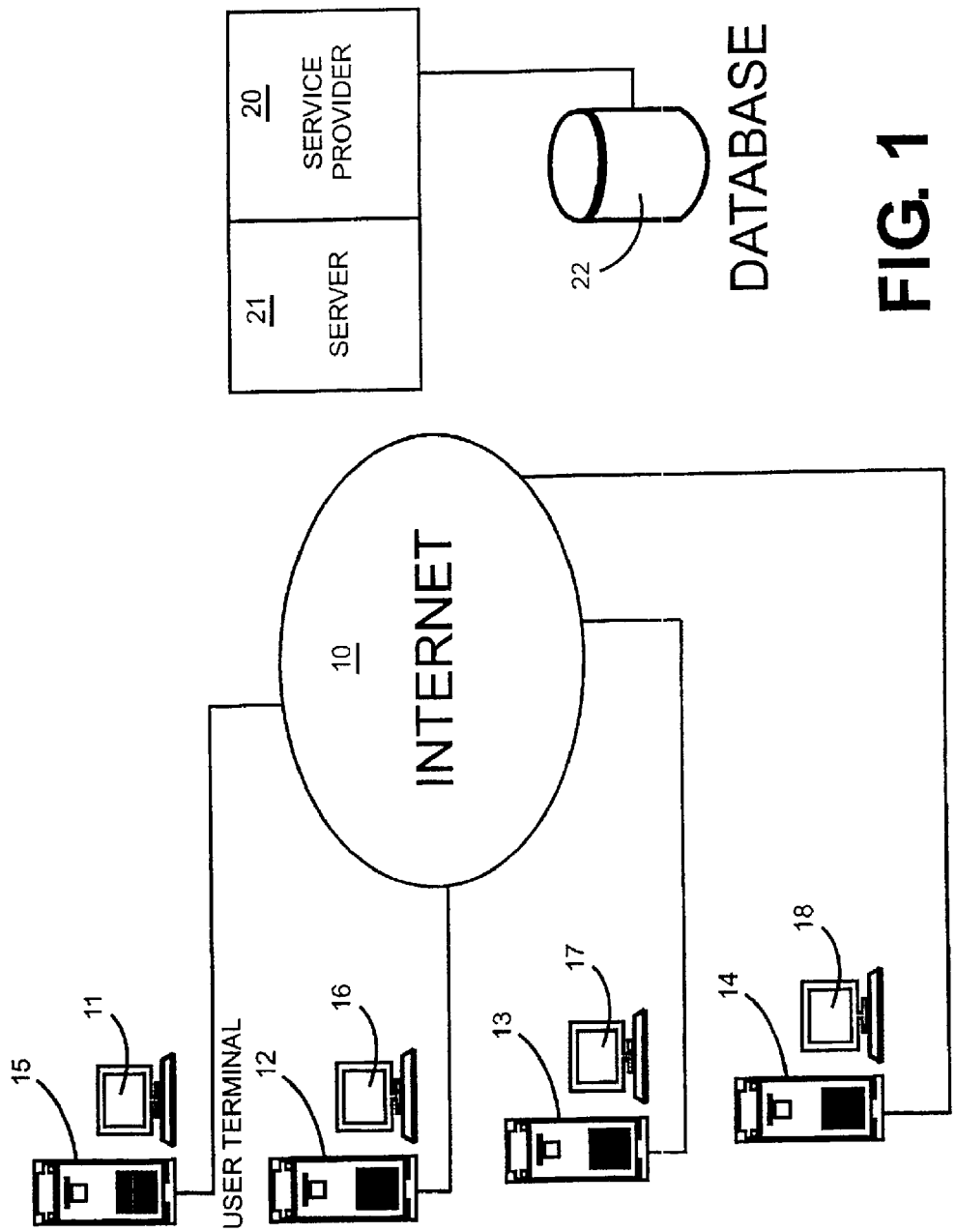
FIG. 1 is a generalized diagrammatic view of a network portion showing a group of user computer display stations on which the virtual universe is displayed interconnected via the Internet or Web under the control of a service provider.

Referring to FIG. 1, there is shown, a network including plurality of display stations, 15 through 18, of users who are participating in the multi-user interactive simulated virtual universe of the present invention, which is respectively displayed to each user on displays 11 through 14 of stations 15 through 18. The stations are interactively interconnected over the Internet or Web 10 controlled by servers, e.g. server 21 under the control of a service provider 20 that controls the displayed virtual reality universes based on the established rules and tracks the interactions of the participating users. The data supporting the rules, the virtual displayed landscape and the avatars and objects are stored in database 22. As will be hereinafter described in greater detail in the aging of avatars and objects in the present invention, among the rules controlling the virtual universe set beforehand and controlled by the service provider 20 are the settings of defined parameters for the aging of said avatars and objects toward eventual removal of said avatars and objects from the virtual universe space. Correspondingly, the users at terminals 12 through 15 are enabled to interactively set, through respective display screens 11 and 16 through 18, the predetermined set of events, events that would result in the modifying of the aging of the selected avatars and objects. The modifying may decelerate or accelerate the aging, or it may reverse the aging as will be subsequently described.

Figure 2:
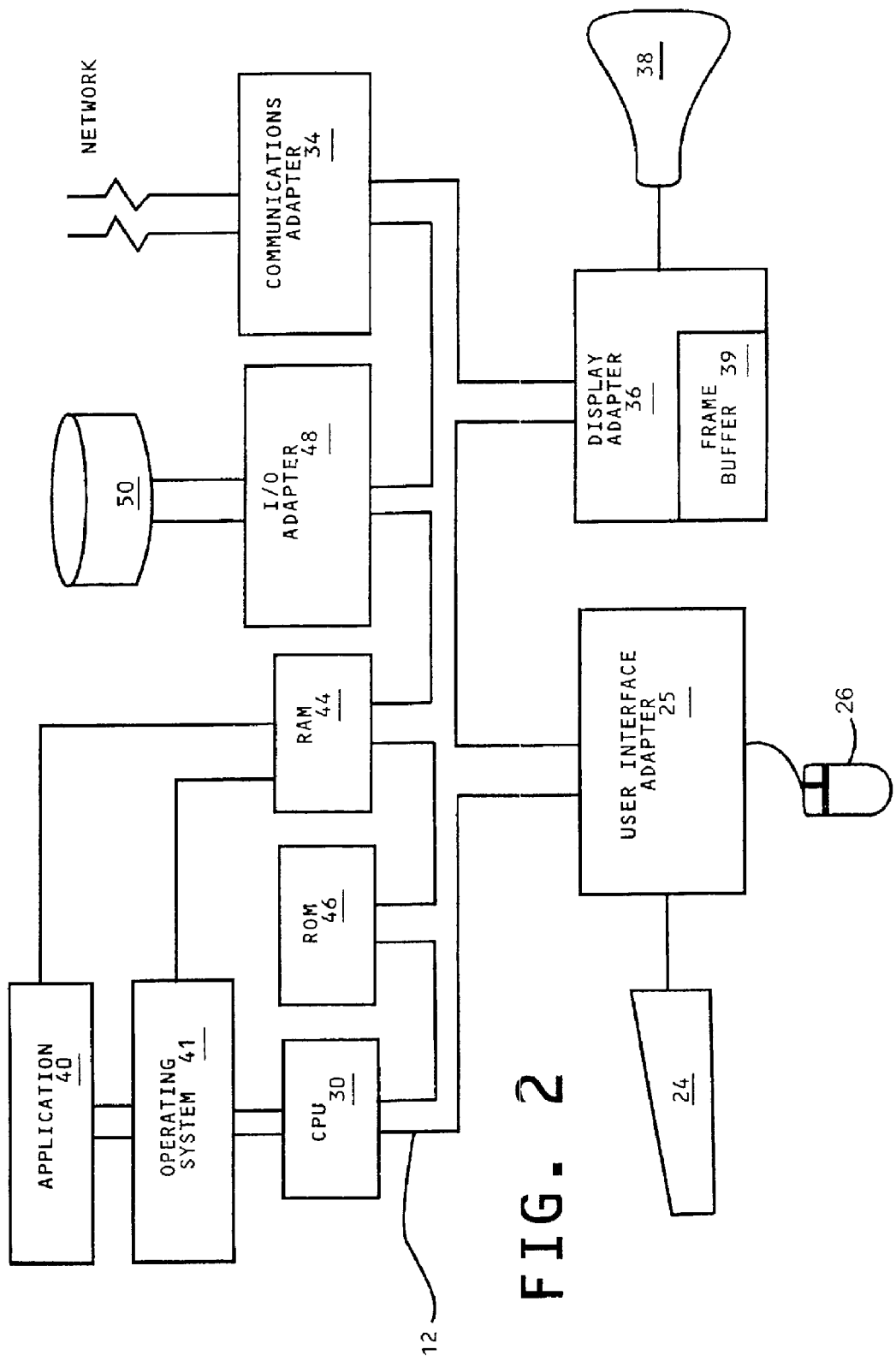
FIG. 2 is a block diagram of a data processing system, including a central processing unit and network connections via a communications adapter that is capable of implementing the receiving user terminals on which a user may receive and interact with the virtual universe. The system may be used for all of the other computers used in the present invention, including the system servers user by the service providers, as well as all other Internet or Web servers.

Referring to FIG. 2, a typical data processor terminal is shown that may function as the user terminals 12 through 15 on which the users may interact with the virtual universe displayed on their associated displays. The system shown in FIG. 2 may be used for all of the other computers used in the present invention, including the server 21 of service provider 20.

In FIG. 2, a central processing unit (CPU) 30 is provided and interconnected to various other components by system bus 32. An operating system 41 runs on CPU 30, provides control and is used to coordinate the function of the various components of FIG. 1. Operating system 41 may be one of the commercially available operating systems. Application programs 40, controlled by the system, are moved into and out of the main memory Random Access Memory (RAM) 44. These programming applications include all of the virtual universe control programs for the practice of the present invention and will also be described hereinafter.

A Read Only Memory (ROM) 46 is connected to CPU 30 via bus 32 and includes the Basic Input/Output System (BIOS) that controls the basic computer functions. RAM 44, I/O adapter 48 and communications adapter 34 are also interconnected to system bus 32. I/O adapter 48 communicates with the disk storage device 50. Communications adapter 34 interconnects bus 32 with an outside Web or like network. I/O devices are also connected to system bus 32 via user interface adapter 25 and display adapter 36. Keyboard 24 and mouse 26 are all interconnected to bus 32 through user interface adapter 25. It is through such input devices that the user may interactively relate to the programs of this invention. Display adapter 36 includes a frame buffer 39 that is a storage device that holds a representation of each pixel on the display screen 38. Images may be stored in frame buffer 39 for display on monitor 38. By using the aforementioned I/O devices, a user is capable of inputting information to the system through keyboard 24 or mouse 26 and receiving output information from the system via display 38.

Figure 3:
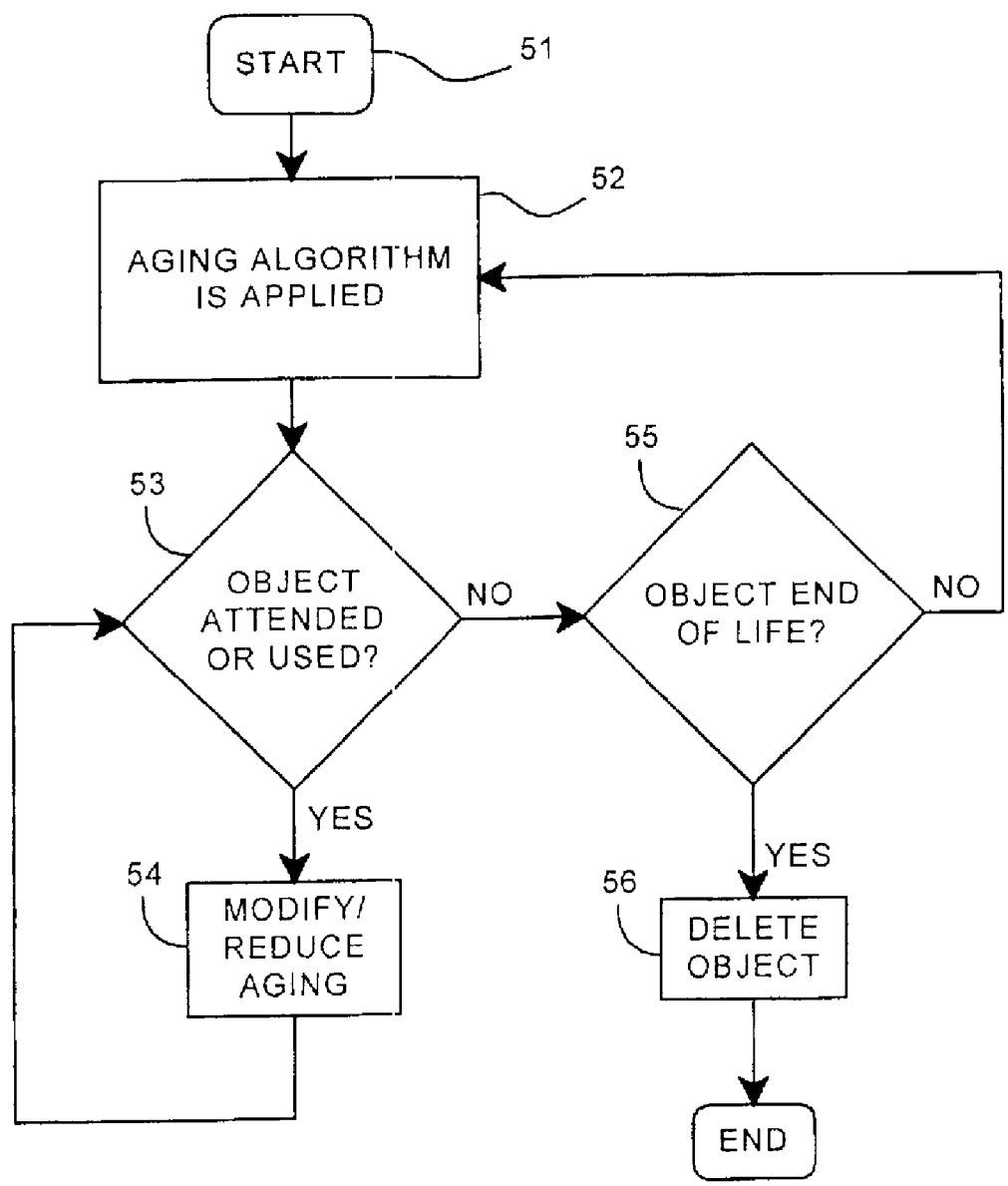
FIG. 3 is a very general flowchart of a program set up to implement the present invention in aging toward eventual removal of avatars and objects with diminished activity.

The running of an illustrative basic program in accordance with the present invention will now be described in the stages shown in FIG. 3. In FIG. 3 there will be described a general aging mechanism that functions to provide to virtual universe control systems an indication that the avatar or object has aged to the eventual point of removal from the virtual universe. The treatment of the object or avatar at this eventual point, e.g. whether it will be completely removed or partially rendered in a low resolution displayed version, or maintained in some other dormant state, will be hereinafter described in greater detail. In other words, FIG. 3 is a very general description on the determination of the eventual end of life, i.e. removal, of the aged object. The specifics of how an object can be aged will be described with respect to the flowchart of FIG. 4, and thereafter.

For convenience in description, it should be further understood that when the aging or related functions are described with respect to an object, such description is also applicable to avatars. The aging or timing out of the object is commenced in step 51, FIG. 3, when there is no activity or diminished activity for a determined period of time. An aging algorithm, appropriate to the virtual universe is applied, step 52. This aging may be simple or complex. It is based upon the complexity level and resources of the virtual universe system within which the algorithm is operating. Many of these will be described hereinafter. For example, the virtual universe system may enable the user to set his own specifications as to aging, and the virtual world system will then use its own basic algorithm to set aging levels and to resolve conflicts with the user specifications.

Thus in the aging algorithm, a determination is then made, step 53, as to whether the object being aged has been used. If Yes, the aging or timing out is modified. In accordance with the rules for aging by the system and user, any use may optionally end the aging or timing out process and the object returned to full active status, i.e. the aging will have been reversed. On the other hand, the usage may only slow down or decelerate the aging, in which case the aging is decelerated, step 54, and the process returned to step 53 wherein the application of the aging algorithm is continued.

If the determination in step 53 is No, the object has not been attended or used, then, step 55, a further determination is made as to whether the end of life or time out level for the object has been reached. If Yes, then step 56, the object is deleted from the virtual world space, or put into a dormant state, as will hereinafter be described. If No, then the process is returned to the aging algorithm, step 52, and the application of the time out is continued.

Figure 4:
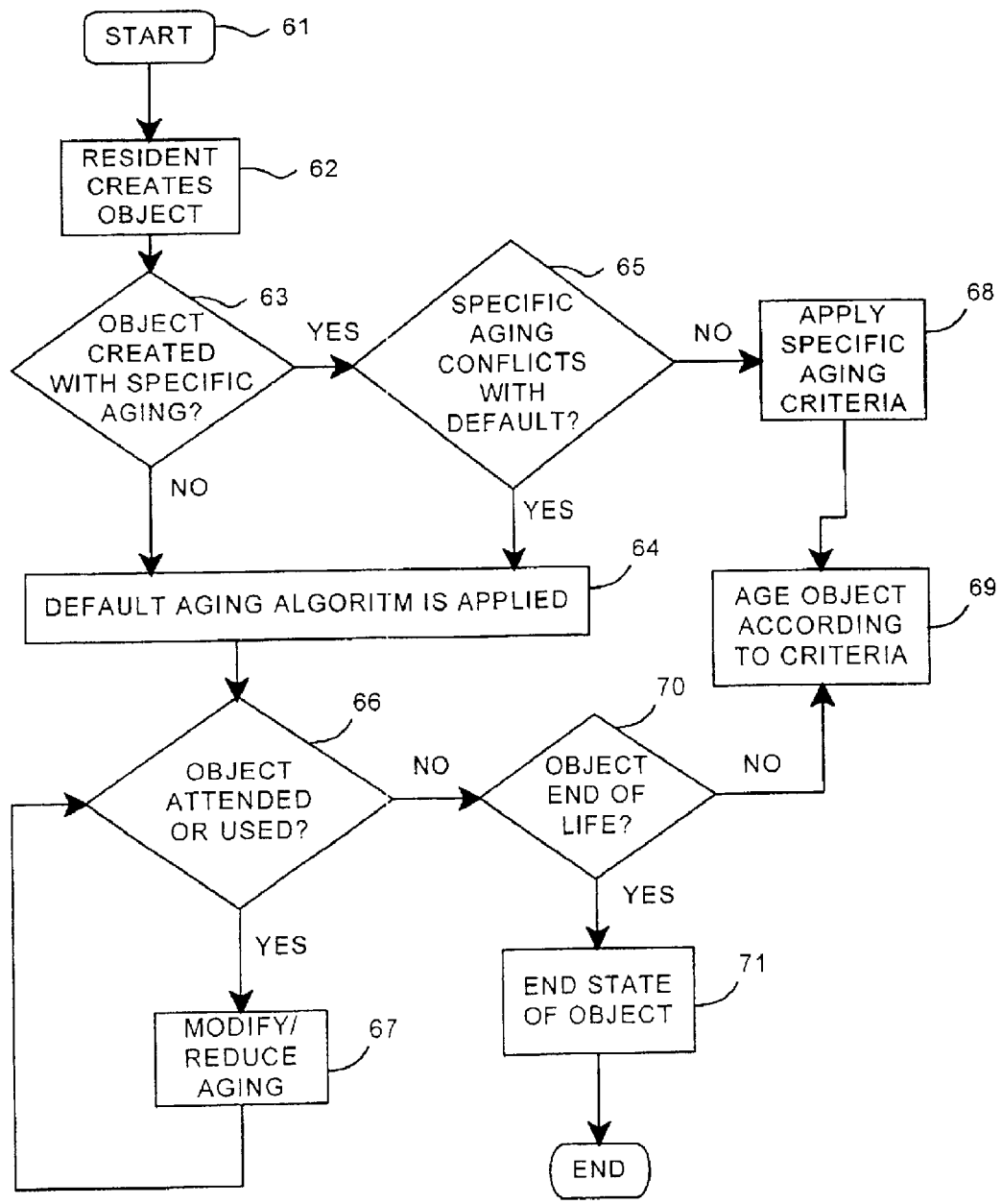
FIG. 4 is a more detailed general flowchart of a program set up to implement the present invention in aging toward eventual removal of avatars and objects with diminished activity.

With reference to FIG. 4, there will now be described an aging, i.e. time out, algorithm that is more complex than the basic system of FIG. 3. The algorithm of FIG. 4 is directed to the specifics of the aging mechanism and how such aging may be affected or modified by user determined events; the occurrence of which will modify the aging of an object associated with or related to by the user. Since the algorithm of FIG. 4 enables the user to create the objects associated with his avatar and provides the users with specific parameters for the aging of such objects, such user specific aging would be of little consequence if it could eliminate the user himself.

Accordingly, the process is initiated 61 when the user or virtual landscape resident creates an object, step 62. A determination is first made as to whether the user has created his own specific algorithm for the aging of the created object, step 63. If the determination in step 63 is No, there is no specific user algorithm, then, step 64, the default or system aging algorithm is applied. If the decision in step 63 is Yes, the user has created his own specific aging algorithm for the object, then a further determination is made, step 65, as to whether the user specific aging algorithm conflicts with the default algorithm of the system. If Yes, the process is branched to step 64, the default aging algorithm proceeds. Then, in the default or system aging algorithm, a determination is then made, step 66, as to whether the object being aged has been used. If Yes, the aging is modified. In accordance with the rules for aging by the system and user, any use may end the aging or timing out process and the object returned to full status. On the other hand, the usage may only slow down or decelerate the aging, in which case, the aging is decelerated, step 67, and the process returned to step 66 wherein the application of the aging algorithm is continued.

If the determination in step 66 is No, the object has not been attended or used, then, step 70, a further determination is made as to whether the end of life or time out level for the object has been reached. If Yes, then, step 71, the object state is ended and the object is deleted from the virtual world space or treated as a dormant object, as will hereinafter be described.

Now, if the determination in step 65 is No, there is no conflict, then, step 68, the user's specific aging algorithm is applied and the object is aged accordingly, step 69, and the determination of step 70 is made as to whether the end of life or time out level for the object has been reached. If Yes, then, step 71, the object state is ended and the object is deleted from the virtual world space. If No, the process is returned to step 69 wherein the object is aged accordingly and the above-described process is continued.

In the process described with respect to FIG. 4, the flowchart and description have been generalized in order to clearly point out the effect of enabling a user to predetermine a set of events, the occurrence of which events would modify the aging of objects, i.e. user specific aging on the system defined parameters for the aging of objects, toward eventual removal from the virtual universe space.

There will now be described specific system aging parameters, as well as user specific events that would trigger modification of the aging of particular objects, i.e. specific correlation of steps 63, 64, 65, 68 and 69 in FIG. 4.

Considering now an example of the resolving of conflicts between user specific events that effect the aging of displayed objects, assume that the system, i.e. the default, step 65, aging algorithm uses "rust" as an indication of aging and sets this forth when the amount of rust on an object that is tracked crosses a 20% threshold of rust as an aging parameter. On the other hand, if the user specification in step 63 specifies that the rust in the user's object should be shown in red or in orange, the determination in step 65 will be No conflict and the user's specific rust parameter on rusting will be applied, step 68. In another example, if the virtual world default or system ages unused objects every 24 hours, then a user specific instruction "never age this object" will result in a Yes decision in step 65, the default algorithm will be applied and the user specific instruction will be ignored.

The virtual universe system may set the default or defined parameters for the aging mechanism. For example:

aging conditions: e.g. even where the avatar associated with an object does not attend to an object, the system may determine that the attention of another non-associated avatar may slow down the aging or timing out of the object according to a default or system parameter;

creation date: solely on this date irrespective of any other user specifics;

classes of users: e.g. premium service users may not have any of their objects aged under conditions where just normal users could have aging of objects;

variations in the system support resources: where there are variations in the amount of computational resources for heavy loads, the aging may be aged more quickly when the resources are strained;

competitive success: objects may be aged based upon the outcome of game competitions or other, e.g. commercial, competitions in the virtual universe.

A significant aspect of this invention involves the predetermination of a set of events, the occurrence of any one of which would trigger the modification of the aging of specified objects. Some examples of such triggering events are:

user directed events: the user may be enabled to predetermine such modifying events, i.e. the user object specific events, step 63, FIG. 4, as long as such events do not conflict with the default or system aging parameters, step 65;

visitation directed events: the aging may be affected by the frequency of visitation of the owner of objects or avatars visitation to the virtual universe, e.g. even a single visit;

advertising based: it is recognized that advertiser sponsors of areas in the virtual universe (VU) are a commercially Important source of revenue. Thus, when an advertiser commences to sponsor a VU area, this event may trigger the modification of aging of objects in the sponsor's area;

private property (owned land) based: where the objects are on VU land owned by a user, the owner may be enabled to predetermine such modifying events, i.e. the user object specific events, step 63, FIG. 4, as long as such events do not conflict with the default or system aging parameters, step 65;

Active object interaction based: An active interaction by one or more avatars with an object in the VU could decrement or reset an active usage counter to thus modify the aging of the object. Actually one or more avatars could vote on the value of the object wherein the aging of the object could be modified accordingly;

Passive object interaction based: A passive interaction by one or more avatars with an object in the VU could decrement or reset a passive user usage counter to thus modify the aging of the object. Examples of such passive interaction would include capturing the image or virtual photograph of an object, or the extent of viewing or discussion of the particular passive object within the VU;

proximity based: the aging of objects may be based upon the density of other objects or avatars in a specific proximity to the object;

ownership change based: a change in ownership may be determined to be a trigger for a change of the aging of an owned object;

location change based: a change in location of an object may be determined to be a trigger for a change in the aging of a relocated object.

At this point, there will be considered the disposition of objects or avatars that have reached the eventual point of removal from the virtual universe, i.e. have been aged to the end of life state. The objects and avatars may be completely and permanently deleted from the system. Optionally, the system may be set up to send the binary code descriptions of deleted avatars and objects to the user for possible future use should the user decide to subsequently return to the VU. Objects that are deleted from the system may be archived, e.g. stored for a period of time in low cost backup storage media at the VU service provider. Also, the end of life objects may be reduced to a dormant state, e.g. maintained in the VU in a low resolution version. The resolution of such inactive or unattended objects may be reduced even to the point of a vague outline on the display screen. This minimizes the data processing resources needed to support the object but makes the object present and available for reactivation.

Although certain preferred embodiments have been shown and described, it will be understood that many changes and modifications may be made therein without departing from the scope and intent of the appended claims.

What is claimed is:

1. In a computer controlled displayed virtual universe space including avatars and objects respectively owned by a plurality of users having interactive access, a method for the aging of objects and avatars comprising:
    enabling the setting of defined parameters for the aging of said avatars and objects toward eventual removal of said avatars and objects from said virtual universe space;
    predetermining a set of events, the occurrence of any one of which events would modify the aging of selected avatars and objects; and
    modifying the aging of at least one of said avatars and objects responsive to the occurrence of one of said predetermined events;
    wherein one of said defined parameters is associated with the frequency of user login into the virtual universe space, and one of said events includes a user login into the virtual universe space, and said modifying the aging of at least one of the said avatars and objects includes decelerating aging of at least one of said avatars and objects owned by a user based upon the frequency of said user login into the virtual universe space.

2. The method of claim 1, further including:
    enabling a system manager of said virtual universe space to set said parameters for aging; and
    enabling a user to determine said set of events modifying said aging for the avatars and objects.

3. The method of claim 2, wherein the modifying of said aging decelerates the aging.

4. The method of claim 3, wherein the deceleration of said aging comprises reversing said aging.

5. The method of claim 3, wherein said eventual removal of said aged avatars and objects puts said avatars and objects into a dormant state renewable by a user.

6. The method of claim 5, wherein an avatar or object in said dormant state is maintained in the virtual universe space as a low resolution version of the original avatar or object.

7. The method of claim 3, wherein:
    a user owns virtual land in said virtual universe space; and
    said aging of said avatars and objects of said user in said owned land is decelerated by activity within said owned land.

8. The method of claim 3, wherein said aging of avatars and objects owned by a user are decelerated based upon the frequency of said user visitation to the virtual universe space.

9. The method of claim 3, wherein said aging of avatars and objects is decelerated by advertiser related activity in the area where said avatars and objects are located.

10. The system of claim 2, wherein the modifying of said aging accelerates the aging.

11. A computer usable storage medium having stored thereon a computer readable program for the aging of objects and avatars in a computer controlled displayed virtual universe space including avatars and objects respectively owned by a plurality of users having interactive access, wherein the computer readable program when executed on a computer causes the computer to:
    enable the setting of defined parameters for the aging of said avatars and objects toward eventual removal of said avatars and objects from said virtual universe space;
    predetermine a set of events, the occurrence of any one of which events would modify the aging of selected avatars and objects; and
    modify the aging of at least one of said avatars and objects responsive to the occurrence of one of said predetermined events;
    wherein one of said defined parameters is associated with the frequency of user login into the virtual universe space, and one of said events includes a user login into the virtual universe space, and said modifying the aging of at least one of the said avatars and objects includes decelerating aging of at least one of said avatars and objects owned by a user based upon the frequency of said user login into the virtual universe space.

12. The computer usable storage medium of claim 11, wherein the computer program when executed further:
    enables a system manager of said virtual universe space to set said parameters for aging; and
    enables a user to determine said set of events modifying said aging for the avatars and objects.

13. The computer usable storage medium of claim 12, wherein the modifying of said aging either decelerates or accelerates the aging.

14. The computer usable storage medium of claim 13, wherein
    a user owns virtual land in said virtual universe space; and
    said aging of said avatars and objects of said user in said owned land is decelerated by activity within said owned land.

15. The computer usable storage medium of claim 13, wherein said aging of avatars and objects is decelerated by advertiser related activity in the area where said avatars and objects are located.

16. In a computer controlled displayed virtual universe space including avatars and objects respectively owned by a plurality of users having interactive access, a system for the aging of objects and avatars comprising:
    a processor;
    a computer memory holding computer program instructions which when executed by the processor perform a method for the aging of objects and avatars comprising:
    enabling the setting of defined parameters for the aging of said avatars and objects toward eventual removal of said avatars and objects from said virtual universe space;
    predetermining a set of events, the occurrence of any one of which events would modify the aging of selected avatars and objects; and
    modifying the aging of at least one of said avatars and objects responsive to the occurrence of one of said predetermined events;
    wherein one of said defined parameters is associated with the frequency of user login into the virtual universe space, and one of said events includes a user login into the virtual universe space, and said modifying the aging of at least one of the said avatars and objects includes decelerating aging of at least one of said avatars and objects owned by a user based upon the frequency of said user login into the virtual universe space.

17. The system of claim 16, wherein said performed method further includes:
    enabling a system manager of said virtual universe space to set said parameters for aging; and
    enabling a user to determine said set of events modifying said aging for the avatars and objects.

18. The system of claim 17, wherein the modifying of said aging decelerates the aging.

19. The system of claim 17, wherein the modifying of said aging accelerates the aging.

20. The system of claim 16, further including means for putting said eventually removed objects into a dormant state renewable by a user.

* * * * *